United States Patent [19]

Ichihara et al.

[11] Patent Number: 4,775,229
[45] Date of Patent: Oct. 4, 1988

[54] FRESNEL LENS IN A FINDER OPTICAL SYSTEM

[75] Inventors: Yutaka Ichihara, Yokohama; Daijiro Fujie, Sagamihara; Keiji Ohsawa, Yokohama, all of Japan

[73] Assignee: Nippon Kogaku K. K., Tokyo, Japan

[21] Appl. No.: 830,872

[22] Filed: Feb. 19, 1986

[30] Foreign Application Priority Data

Feb. 22, 1985 [JP] Japan .................................. 60-33906

[51] Int. Cl.$^4$ ............................. G02B 3/08; G02B 3/10
[52] U.S. Cl. .................................... 350/452; 350/437
[58] Field of Search ............... 350/452, 432, 410, 437; 354/121

[56] References Cited

U.S. PATENT DOCUMENTS 3,004,470  7/1957  Rühle ............................. 350/452 X

FOREIGN PATENT DOCUMENTS 144502  7/1982  Japan ................................... 350/432
129705  7/1985  Japan ................................... 350/452

*Primary Examiner*—John K. Corbin
*Assistant Examiner*—Ronald M. Kachmarik
*Attorney, Agent, or Firm*—Shapiro and Shapiro

[57] ABSTRACT

A Fresnel lens provided in the finder of a camera includes a central portion through which an optic axis passes, and a plurality of annular portions spaced apart from the central portion and disposed concentrically. The central portion and the plurality of annular portions have their respective focal lengths. The focal length of the central portion is shorter than the focal length of one of the annular portions which is remotest from the optic axis.

8 Claims, 3 Drawing Sheets

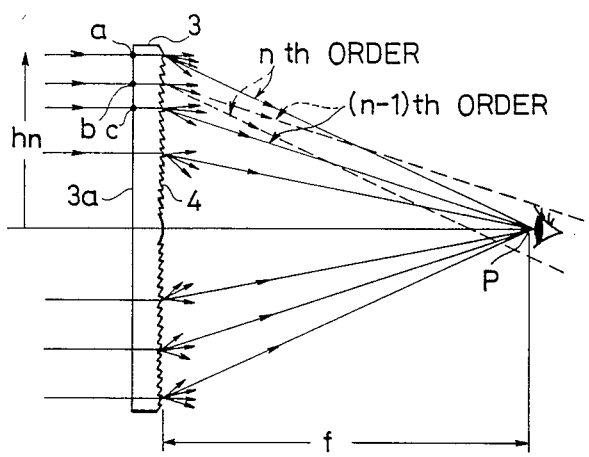
FIG. 5
FIG. 6A
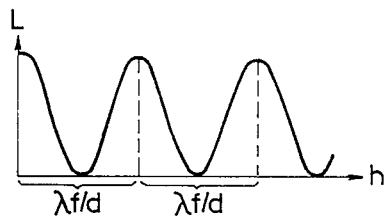
FIG. 6B
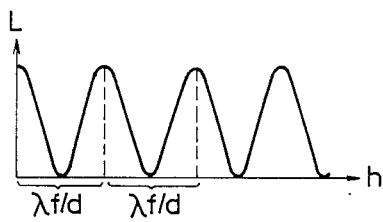
FIG. 6C
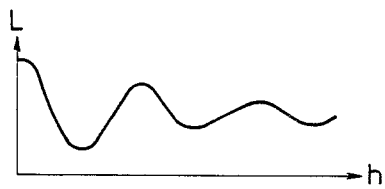
FIG. 6D
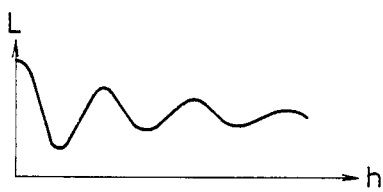
FIG. 6E
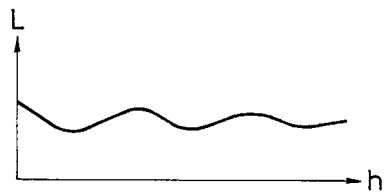
FIG. 6F
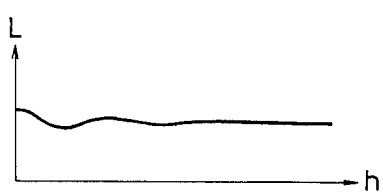

FRESNEL LENS IN A FINDER OPTICAL SYSTEM

BACKGROUND OF THE INVENTION

This invention relates to a Fresnel lens used in the finder or the like of a single lens reflex camera or the like.

RELATED BACKGROUND ART

In the finder of a single lens reflex camera or the like, a Fresnel lens, in addition to a condenser lens, is usually used to cause a light imaged on a focusing screen to turn toward the observing eye. For example, in the finder optical system of a conventional single lens reflex camera shown in FIG. 1 of the accompanying drawings, the light from an object to be photographed passed through a photo-taking lens 1 and a stop 8 is directed upwardly by a movable mirror 2 and forms the image of the object to be photographed on the screen surface 3a of a focusing screen 3. This screen surface 3a has its entire area formed into a diffusing surface, except the central portion thereof on which a split prism and/or a microprism is provided, and an image equal to an image photographed on the film is observed on this screen surface 3a. In this case, the light is scattered by the diffusing surface which is the screen surface 3a and therefore, in order to effectively direct the scattered light to an eyepiece 7 through a pentaprism 6, a Fresnel lens 4 is integrally formed on the opposite side of the screen surface 3a of the focusing screen 3 which is opposed to a condenser lens 5.

This Fresnel lens 4, which performs a function essentially similar to that of the condenser lens 5, is used to cooperate with the condenser lens 5 to condense the light because the condenser lens 5 alone is insufficient in power. The Fresnel lens is such that a lens whose convex surface is indicated by dots-and-dash lines in FIG. 2 of the accompanying drawings is divided into concentric annuli (usually equally spaced apart) as shown in FIG. 3 of the accompanying drawings and the thickness thereof is formed substantially uniformly as shown in FIG. 2. Heretofore, in a Fresnel lens used in the finder of a camera, use has generally been made of an annulus width d (pitch) of about 40 $\mu$m.

Now, when the above-described heretofore used Fresnel lens 4 having the annulus width d of about 40 $\mu$m is enlargedly observed through the eyepiece 7, unless the observer is weak-sighted, the annuli of the Fresnel lens are seen as being superposed on the image of the object to be photographed, and this has been cumbersome during framing. To make these annuli invisible, the width (pitch) of the annuli may simply be made narrow. However, if this pitch is made as fine as 30 $\mu$m - 20 $\mu$m, the annuli certainly become invisible, but the result of an experiment shows that there is a disadvantage that when the aperture of the photo-taking lens is stopped small, there appear white interference fringe-like concentric annular stripe patterns like concentric, Newton's rings which become thinner from the center toward the outside as shown in FIG. 4 of the accompanying drawings.

SUMMARY OF THE INVENTION

It is an object of the present invention to provide a Fresnel lens in the finder optical system of a camera which enables the bright, clear-cut image of an object to be photographed to be observed.

To achieve the above object, in the Fresnel lens of the present invention, there are formed a plurality of refracting surfaces different in focal length.

To achieve the above object, in the Fresnel lens of the present invention, refracting surfaces are formed so that the focal length of the central portion of the lens through which the optic axis passes is shorter than the focal length of the marginal portion of the lens distant from said central portion.

To achieve the above object, the Fresnel lens of the present invention is designed so that the focal length thereof becomes longer in accordance with the distance from the optic axis.

BRIEF DESCRIPTION OF THE DRAWINGS

FIG. 5 illustrates the reason why the stripe patterns shown in FIG. 4 are created.

FIGS. 6A–6F illustrate the distributions of the quantity of light of stripes entering an eye.

DESCRIPTION OF THE PREFERRED EMBODIMENT

First the principle of the multi-focus Fresnel lens of the present invention will be described.

Figure 2:
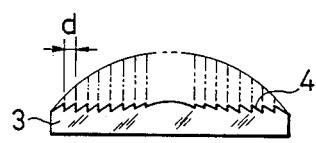
FIG. 2 is a cross-sectional view of the conventional Fresnel lens.
Figure 3:
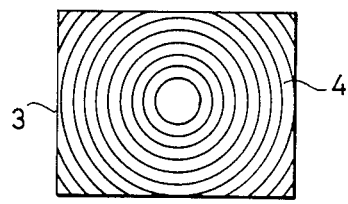
FIG. 3 is a plan view corresponding to FIG. 2.

A Fresnel lens is comprised of concentric, equally spaced apart, thin annuli, as shown in FIG. 3, and therefore this can be considered to be a rotation-symmetrical diffraction grating. Moreover, each annulus is formed into a prism of minute structure and thus, a grating is constructed in this Fresnel lens. The blaze angle of the Fresnel lens is not constant, but is greater in the marginal portion of the lens and smaller toward the center of the lens, as shown in FIG. 2.

The angle of diffraction of the diffraction grating formed into the annular shape will now be considered. The angle of diffraction of the nth order diffracted light is determined by only the pitch of the grating and the wavelength. Assuming that the angle of diffraction is $\theta n$ and the wavelength of the incident light is $\lambda$ and the pitch of the grating is d, the angle of diffraction $\theta n$ of the nth order light is represented by the following equation:

$$\theta n = \sin^{-1} n \cdot \lambda / d \ldots \qquad (1)$$

Accordingly, as is apparent from equation (1), in the case of the Fresnel lens, the angle of diffraction $\theta n$ assumes a value which does not depend on the location in the lens (the distance from the center of the lens).

However, of many orders of diffracted light, only one or two orders of diffracted light suited for the blaze angle are high in intensity of light. Moreover, the blaze angle differs from location to location in the lens and therefore, the light rays diffracted by the Fresnel lens are intensely diffracted in different directions depending on the location in the lens. That is, different orders of diffracted light come out depending on the location in the lens, and a position at which these orders of intensely diffracted light gather is the focus. This state is shown in FIG. 5.

The reason why concentric stripe patterns (see FIG. 4) are formed when the aperture of a photo-taking lens is stopped down will now be described. In FIG. 5, let it be assumed that of light rays incident on a point a, the nth order diffracted light is intense and of light rays incident on a point c, the (n−1)th order diffracted light is intense. In this case, it is clear from the theory of diffraction that the nth order and (n−1)th order diffracted light come out intensely at the point b between the point a and the point c, and it is seen that the intensities of those orders of light are each of the order of 40% as compared with the intensities at the points a and c. The remaining 20% is dispersed in the other orders of diffracted light.

Figure 1:
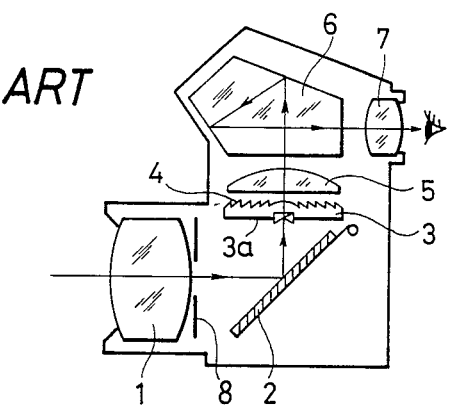
FIGS. 1 is a cross-sectional view showing the finder optical system of a single lens reflex camera having a conventional Fresnel lens for a focusing screen.
Figure 4:
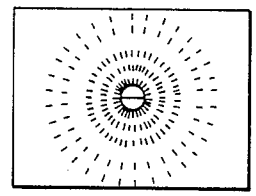
FIG. 4 is a plan view showing the stripe patterns by diffracted light in the conventional Fresnel lens.

If the observer's eye is placed at the position of the focus P of this Fresnel lens as shown in FIG. 5, the light, incident on the points a and c enters the pupil of the oberver's eye a indicated by solid lines. However, as regards the light incident on the point b, neither of the nth order diffracted light and the (n−1)th order diffracted light gathers at the focus P as indicated by broken lines and enters the pupil. Therefore, when the observer looks squarely at the Fresnel lens 4, light portions and dark portions are observed substantially at equal intervals depending on the locations in the lens. The annuli of this Fresnel lens 4 are rotation-symmetrical and therefore are observed as concentric and equally spaced apart diffraction stripe patterns as shown in FIG. 4. Actually, a focusing screen 3 having this Fresnel lens 4 is observed by means of an eyepiece 7 through a condenser lens 5 and a pentaprism 6, as shown in FIG. 1.

The position at which the stripes become light can be quantitatively found in the following manner. That is, assuming that the position of the incident light at which the nth order diffracted light is intensely diffracted is at a distance hn from the lens center of the Fresnel lens and that the angle of diffraction thereof is $\theta n$ and the focal length thereof is $f$, there is obtained the following equation:

$$\tan\theta n = hn/f \ldots \quad (2).$$

Also, from the aforementioned equation (1), $$\sin\theta n = n\cdot\lambda/d \ldots \quad (3).$$

If $\theta$ is small and $\tan\theta \approx \sin\theta$, from equations (2) and (3), $$hn \approx n\cdot\lambda\cdot f/d \ldots \quad (4).$$

That is, as is apparent from formula (4), in lenses of the same focal length, as the pitch of the annuli becomes finer, the interval $\lambda\cdot f/d$ between the stripes becomes rougher, and if the pitch d becomes rougher, the interval between the stripes becomes finer. Also, if the ratio of the focal length $f$ to the pitch d is equal, the interval between the stripes is the same.

For example, when $\lambda = 550$ nm and $f = 80$ mm, if d = 40 μm, $\lambda\cdot f/d = 1.1$ mm, and if d = 30 μm under the same conditions, $\lambda\cdot f/d = 1.47$ mm.

Actually, light is not a monochromatic but is chiefly white light and therefore, higher order diffracted light causes more color misregistration and stripes become unclear. That is, stripes become more unclear away from the center as shown in FIG. 4, and become unobservable at the sixth to seventh stripes from the center. Further, since the aperture of the photo-taking lens has a certain degree of magnitude, the incident light is not parallel light but enters from various angles and therefore, the stripes become more unclear. Therefore, in ordinary bright lenses, stripes are usually not seen, whereas if the aperture is stopped down to the order of F-number 16, annular diffraction stripe patterns will become visible.

Also, the opposite surface of the Fresnel lens is formed into a diffusing surface and therefore, under the influence thereof, the annular diffraction stripe patterns become more unclear. If this diffusing surface is an ideal complete diffusing surface, the stripes can be made completely invisible. However, if this diffusing surface is made into a complete diffusing surface, the finder view field will become dark and the finder will become unusable and for this reason, actually, a diffusing surface of low diffusibility is used. Even if the diffusing surface is of low diffusibility as mentioned above and the aperture is small, when the pitch of the annuli of the Fresnel lens is rough, the interval between the diffraction stripe patterns is fine and therefore, the stripes become blurred and invisible. Conversely, when the pitch is fine, the interval between the stripes becomes rough and therefore, even if the stripes are blurred to some extent by the aperture or the diffusing surface, when the pitch is made so fine that the interval between the stripes is greater than the amount of blur, the stripes will not vanish but will remain and become observable.

FIGS. 6A–6F are graphs of the distributions of the quantity of light entering the eye for illustrating the state of said stripes. FIGS. 6A, 6C and 6E show the distributions of the quantity of light of the diffraction stripes of Fresnel lenses in which the pitch d of the annuli is small (stripes are rough), and FIGS. 6B, 6D and 6F show the distributions of the quantity of light of the diffraction stripes of Fresnel lenses in which the pitch d of the annuli is great (stripes are fine). In any of these Figures, the ordinate represents the quantity of light L entering the eye and the abscissa represents the distance h from the center of the Fresnel lens. FIGS. 6A and 6B show cases where monochromatic parallel light enters the Fresnel lens, and in these cases, stripes at equal intervals of $\lambda f/d$ are clearly created. FIGS. 6C and 6D show cases where a white light enters the Fresnel lens, and in these cases, as the order of the diffracted light becomes higher, the stripes become more unclear (amplitude is smaller) and as regards the same order, the degree of unclearness does not differ between the state of FIG. 6C in which the pitch is small and the state of FIG. 6D in which the pitch is great. FIGS. 6E and 6F further take the expanse of the incident light and the influence of the diffusing surface into consideration. In FIGS. 6E and 6F, the amount of blur is equal, but in the case of FIG. 6E in which the stripes are rough, the reduction in the degree of clearness is small, and in the case of FIG. 6F in which the stripes are fine, the stripes become mixed and invisible except in the central portion. However, in a Fresnel lens used as the ordinary finder focusing screen, only the central portion thereof is formed into an ordinary lens surface (spherical surface) and is not a Fresnel lens. Therefore after all the stripes are invisible.

Now, from the foregoing, it will be seen that to cause the stripes created by diffracted light to vanish, the stripes may be made fine. Since the interval between the stripes is $\lambda f/d$, the ratio $f/d$ of the focal length $f$ to the pitch d may be made small. For example, in a Fresnel lens, as a result of an experiment which has been carried out for $f=80$ mm and $d=40$ μm, it has been found that no stripe appears under these conditions. So, in order that stripes may not be created even if the pitch d is made small, where for example, $d=30$ μm, if the units of $f$ and d are neglected, from $f(mm)/d(\mu m)=80/40$, $f$ and d may be brought into the relation that $f(mm)=2d(\mu m)=60$. However, in a Fresnel lens of short focal length, the angle of minute prisms constituting annuli becomes sharply intense in inclination in the marginal portion and aberrations occur therein, and this is not desirable from the viewpoint of imaging performance.

Figure 7:
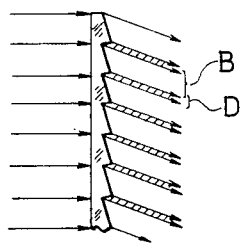
FIG. 7 shows the distribution of light in a case where the angle of prisms is gentle.
Figure 8:
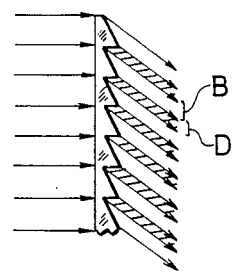
FIG. 8 shows the distribution of light in a case where the angle of prisms is steep.

On the other hand, as shown in FIGS. 7 and 8, when the angle of the minute prisms is steep (FIG. 8) as compared with FIG. 7 in which the angle of the minute prisms is gentle, as can be seen from the width B of the portion through which light passes and the width D of the portion through which light does not pass, the width of the light beam emerging from the minute prism becomes narrow. Considering wave optics, this means that a desired order of diffracted light decreases and the other orders of diffracted light increase. That is, the action of the lens decreases and the function as a diffusing plate increases and therefore, the contrast of the image is reduced and the image becomes poor.

Accordingly, to prevent the above-described aggravation of aberrations and the reduction in the contrast of the image, it will be appreciated that it is better not to make the focal length of the marginal portion of the Fresnel lens much shorter than about 80 mm which is usually used at present. That is, it is preferable to construct a Fresnel lens based on such a non-spherical surface that the focal length in the central portion which is the area near the optic axis in which stripes are see is short and the focal length is long in the marginal portion remote from said area near the optic axis.

An embodiment of the present invention will now be described in detail.

Figure 9:
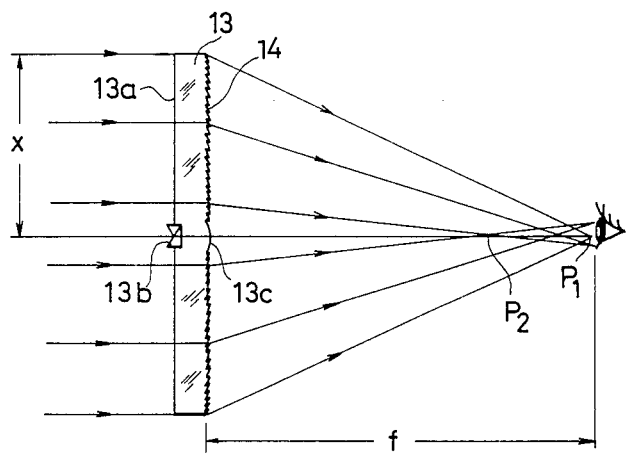
FIG. 9 is a cross-sectional view of an embodiment of the present invention.
Figure 10:
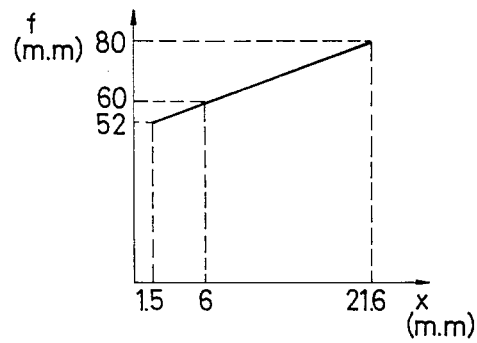
FIG. 10 is a graph showing the characteristic the Fresnel lens of FIG. 9.

FIG. 9 is a cross-sectional view of an embodiment of the Fresnel lens of the present invention formed integrally with the focusing screen of a single lens reflex camera, and FIG. 10 is a graph showing the relation between the distance from the center of the Fresnel lens of FIG. 9 and the focal length thereof.

In FIG. 9, a mat surface 13a and a split prism 13b are formed on the surface of the focusing screen 13, and a Fresnel lens 14 is formed outside a spherical portion 13c formed at the center of the back of the focusing screen. The Fresnel lens 14 is formed as that the focal length thereof is long ($f=80$ mm) in the marginal portion thereof and short ($f \approx 52$ mm) in the central portion and that the focal length of the intermediate portion thereof gradually increases toward the marginal portion.

Now, in a Fresnel lens based on the conventional spherical lens, where the focal length $f=80$ mm and the pitch $d=40$ μm or $f=60$ mm and $d=30$ μm, even if the aperture of the photo-taking lens in a single lens reflex camera is stopped down to a small aperture, stripes by diffracted light are invisible, but in a focusing screen wherein $f=80$ mm and $d=30$ μm, as a result of experiment, stripes by diffracted light have been observed inside a circle of $\phi=12$ mm about the optic axis when the aperture is stopped to the order of F-number 16. So, to realize a Fresnel lens in which stripes by diffracted light are not seen at $d=30$ μm, the refractive power of each annulus may be changed depending on the location so that the focal length of the marginal portion of the Fresnel lens 14 is 80 mm and the focal length in the circle of $\phi=12$ mm about the optic axis is 60 mm or less.

In this case, if the observer's pupil is placed at the focus position $P_1$ (see FIG. 9) of the light beam passed through the marginal area of the Fresnel lens so that the light beam passed through the marginal area of the Fresnel lens is introduced into the pupil, the converging position $P_2$ of the light beam passed through the area near the optic axis of the Fresnel lens becomes distant from the pupil. However, that light beam is near the optic axis and therefore, the angle of convergence thereof is small and the light entering the pupil does not decrease so much. Accordingly, when the focusing screen is observed through the eyepiece of the finder, it does not happen that the field of view near the center becomes dark.

FIG. 10 is a graph in which the abscissa represents the distance x from the optic axis of the Fresnel lens 14 and the ordinate represents the focal length $f$ of the annulus corresponding thereto, and this graph shows that the focal length in the outermost periphery (the four corners of the field frame, $x \approx 21.6$ mm) of the Fresnel lens is $f=80$ mm, the focal length at the distance $x=6$ mm from the center of the Fresnel lens is $f=60$ mm and within a distance less than 6 mm ($x<6$ mm) from the center, the focal length $f$ is less than 60 mm ($f<60$ mm). Also, at a position whereat the distance x from the center is 1.5 mm, $f=52$ mm, and the portion 13c in which $x<1.5$ mm is not formed into a Fresnel. The portion at the distance of 1.5 mm or less from the center corresponds to the split prism 13b on the surface.

The focal length between the above-mentioned focal length $f=80$ mm in the outermost periphery and the focal length $f=52$ mm in the innermost periphery is designed so as to link said two points by a straight line and gradually increase in proportion to the center distance, as shown in FIG. 10. However, the line linking said two points need not always be a straight line, but may be a curve. Even if the variation in the focal length is made discontinuous so that for example, $f=80$ mm at $x \geq 6$ mm and $f=60$ mm at $x<6$ mm, the drawback of the Fresnel lens based on the conventional spherical surface can be eliminated. However, if the focal length is made so extremely discontinuous, a discontinuous portion, i.e., so-called "skip", will occur in the finder image in that discontinuous portion of the focal length and therefore, it is better to vary the focal length continuously.

In the embodiment of FIG. 9, the Fresnel surface 14 is provided on the eye side, but alternatively, the Fresnel lens may be disposed with the mat surface 13a facing the eye side.

According to the present invention, as described above, the focal length in the vicinity of the center of the Fresnel lens is formed shorter than the focal length in the marginal portion of the Fresnel lens and therefore, the stripe patterns by the annuli of the Fresnel lens and diffracted light are not seen and moreover, even in the marginal portion, darkness is not created by a deficiency of the quantity of light, and the difference in the angle of inclination of the surface of the Fresnel lens becomes smaller between the marginal portion and the central portion thereof and thus manufacture is easy.

What we claimed is:

1. In a finder optical system for observation of an image formed on a predetermined plane by a photographing lens of a camera, the improvement which comprises:

a Fresnel lens which is substantially disposed at said predeterined plane, said Fresnel lens having a central portion through which the optic axis passes and a plurality of annular portions which are spaced apart from said central portion and disposed concentrically, said central portion having a predetermined focal length and each of said annular portions having a focal length that is greater than said predetermined focal length and that is greater than the focal length of annular portions that are closer to the optic axis, so that the focal length increases in accordance with the distance from the optic axis.

2. The improvement according to claim 1, wherein a maximum value of the focal length of said Fresnel lens is substantially 80 mm.

3. The improvement according to claim 2, wherein the focal length of said Fresnel lens is less than 60 mm inside of a circle which has a radius of 6 mm about the optic axis.

4. The improvement according to claim 3, wherein the focal length of said Fresnel lens is substantially 60 mm at a distance of substantially 6 mm from the optic axis.

5. The improvement according to claim 4, wherein the focal length of said Fresnel lens is substantially 52 mm at a distance of substantially 1.5 mm from the optic axis.

6. The improvement according to claim 1, wherein a width of each of said annular portions in a direction orthogonal to said optic axis is substantially 30 $\mu$m.

7. In a finder optical system for observation of an image formed on a predetermined plane by a photographing lens of a camera, the improvement which comprises:

a Fresnel lens which is substantially disposed at said predetermined plane, said Fresnel lens having a central portion through which the optic axis passes and a plurality of annular portions which are spaced apart from said central portion and disposed concentrically, a width of each of said annular portions in a direction orthogonal to said optic axis being substantially a predetermined value, said central portion having a predetermined focal length which is determined by said predetermined value, each of said annular portions having a focal length that is greater than said predetermined focal length and that is greater than the focal length of annular portions closer to said optic axis, so that the focal length increases in accordance with the distance from the optic axis.

8. The improvement according to claim 2, wherein said predetermined value is 30 $\mu$m.

* * * * *